US010333744B2

(12) United States Patent
Gscheidle

(10) Patent No.: US 10,333,744 B2
(45) Date of Patent: Jun. 25, 2019

(54) CIRCUIT ASSEMBLY FOR A SWITCHABLE LINE TERMINATION OF A SERIAL BUS

(71) Applicant: KNORR-BREMSE SYSTEME FUER NUTZFAHRZEUGE GMBH, Munich (DE)

(72) Inventor: Wolfgang Gscheidle, Oberstenfeld (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 16/061,202

(22) PCT Filed: Dec. 7, 2016

(86) PCT No.: PCT/EP2016/079994
§ 371 (c)(1),
(2) Date: Jun. 11, 2018

(87) PCT Pub. No.: WO2017/102479
PCT Pub. Date: Jun. 22, 2017

(65) Prior Publication Data
US 2018/0367347 A1    Dec. 20, 2018

(30) Foreign Application Priority Data

Dec. 14, 2015   (DE) .................. 10 2015 121 732

(51) Int. Cl.
*H04L 25/02*   (2006.01)
*G06F 13/40*   (2006.01)
*H04L 12/40*   (2006.01)

(52) U.S. Cl.
CPC ...... *H04L 25/0278* (2013.01); *G06F 13/4086* (2013.01); *H04L 12/40032* (2013.01); *H04L 25/0298* (2013.01); *H04L 2012/40215* (2013.01)

(58) Field of Classification Search
CPC . H04L 25/02; H04L 25/0264; H04L 25/0278; H04L 25/0298; G06F 13/40;
(Continued)

(56) References Cited

U.S. PATENT DOCUMENTS 5,781,028 A    7/1998  Decuir
6,324,044 B1 *  11/2001  Teggatz ............... G06F 13/385
                                                       327/379
(Continued)

FOREIGN PATENT DOCUMENTS

DE    10261386 A1   7/2004
EP     2166717 A1   3/2010

OTHER PUBLICATIONS

International Search Report dated Feb. 28, 2017 of the corresponding International Application PCT/EP2016/079994 filed Dec. 7, 2016.
(Continued)

*Primary Examiner* — Jason Crawford
(74) *Attorney, Agent, or Firm* — Gerard Messina

(57) ABSTRACT

An electronic circuit arrangement, by which a line termination or terminating resistor of a serial bus, for example a CAN bus, is implemented in a switchable manner and can be electronically connected or disconnected by electronically operating switching elements and a microcontroller, or a computer port of the latter, which is present in an electronic control unit.

27 Claims, 2 Drawing Sheets

(58) Field of Classification Search
CPC ............ G06F 13/4063; G06F 13/4068; G06F 13/4086
See application file for complete search history.

(56) References Cited

U.S. PATENT DOCUMENTS

| | | | |
|---|---|---|---|
| 6,590,413 B1* | 7/2003 | Yang | H04L 25/026 326/30 |
| 10,055,374 B2* | 8/2018 | Machauer | G06F 13/368 |
| 2006/0132170 A1* | 6/2006 | Fahrbach | G06F 13/4086 326/30 |
| 2014/0156899 A1* | 6/2014 | Kristiansen | G06F 13/4081 710/305 |
| 2016/0254925 A1* | 9/2016 | Riedel | G06F 13/4068 710/110 |

OTHER PUBLICATIONS

MOSFET "Metall-Oxid-Halbleiter-Feldeffektransistor In: Wikipedia, Die freie Enzyklopaedie".

* cited by examiner

CIRCUIT ASSEMBLY FOR A SWITCHABLE LINE TERMINATION OF A SERIAL BUS

FIELD OF THE INVENTION

The present invention relates to a circuit arrangement for a switchable line termination of a serial bus and relates, in particular, to a circuit arrangement for electronically connecting and/or disconnecting a termination to/from a CAN bus.

BACKGROUND INFORMATION

Serial bus arrangements such as CAN (Controller Area Network), FlexRay and the like are widespread in various technical fields, for example automotive engineering, for the purpose of networking control units. The CAN bus operates, for example, according to the so-called multi-master principle and connects a plurality of control units having equal rights. A CSMA/CR method resolves collisions, that is to say simultaneous bus access operations, without damaging the winning, higher-priority message. For this purpose, the bits are dominant or recessive (a dominant bit overwrites a recessive bit), depending on the state. In this case, the logic 1 is recessive (wired AND). The bus can be physically configured using copper lines or glass fibers, for instance.

Data buses of the above-mentioned type must be very stable on account of the interference immunity required in the automotive environment, in particular, and are therefore generally in the form of a linear bus. In this case, the bus is terminated at both physical ends of its geometrical extent with a respective terminating resistor (bus termination) matched to the characteristic impedance of the bus lines. As a result, reflections produced on the bus lines in the case of higher-frequency data transmission rates can be minimized and the bus can be operated in an optimum manner. Since the CAN bus system is a serially operating two-wire bus with an open architecture which predominantly uses TP (twisted pair) cables with a nominal impedance of 120 ohms as the transmission medium, a conventional terminating resistor or a conventional bus termination in the case of a CAN bus is approximately 120Ω at each of the two ends of the bus.

Since the baud rates of current bus systems are moving toward ever higher values on account of their real-time capability and increasing bus load, a correct bus termination is absolutely necessary for reliable communication.

On account of different levels of equipment of respective vehicles or as a result of the same control unit or the same ECU (Electronic Control Unit) being installed in different vehicle types, the need to respectively arrange or omit the above-mentioned terminating resistors may exist at different locations of the bus inside a vehicle network. In other words, a terminating resistor must be present on the basis of a location at which an ECU is connected to the bus, or said terminating resistor can or must be dispensed with.

Arrangements which can comprise terminating resistors which can be connected manually, for example, by wire bridges, bridges in a cable harness and the like are inflexible and disadvantageous in so far as changes to the characteristic data of a bus cannot be excluded and a function cannot be ensured without any influence on the bus communication.

SUMMARY OF THE INVENTION

Therefore, the invention is based on an object of providing an electronic circuit arrangement for a switchable line termination of a serial bus, which circuit arrangement allows required terminating resistors to be connected (provided) or disconnected (dispensed with) on the basis of an existing configuration of a serial bus or a corresponding bus and control unit configuration.

In addition, the intention is to provide an electronic circuit arrangement for a switchable line termination of a serial bus, which circuit arrangement does not change characteristic data of a connected bus and ensures the function without influencing the communication.

According to the invention, this object is achieved by a circuit arrangement for a switchable line termination of a serial bus having the features described herein. The accompanying further descriptions herein relate to advantageous developments of the invention.

The invention is based on the general idea of providing an electronic circuit arrangement, by which a line termination or terminating resistor of a serial bus, for example a CAN bus, is implemented in a switchable manner and can be electronically connected or disconnected by electronically operating switching elements and a microcontroller, or a computer port of the latter, which is present in an electronic control unit anyway. This makes it possible to advantageously connect/disconnect the terminating resistor (termination resistor) during the production of a vehicle, for example, within the scope of end of line programming, for example.

According to the invention, at least a programmability of different resistance values, a variable bus termination which can be optimized and can be adapted to vehicle-related and/or geometrical conditions, the best possible data transmission quality and the cessation of mismatches to the bus lines can be achieved as advantages.

In accordance with the statements made above, the object is specifically achieved by a circuit arrangement for a switchable line termination of a serial bus, which circuit arrangement comprises an electronic switching apparatus which is connected between signal lines of the serial bus and is arranged, under the control of a control device of an electronic control unit, to connect a predetermined line termination to the serial bus or to disconnect the line termination from the serial bus.

The electronic switching apparatus may include a first and a second electronic switching device, and the line termination comprises a first and a second line termination element, wherein the first and second electronic switching devices are reverse-connected in series with one another, and the first and second electronic switching devices are arranged to simultaneously connect the first and second line termination elements to the first and second signal lines of the serial bus, respectively, or to simultaneously disconnect them therefrom in a symmetrical and voltage-controlled manner.

The first line termination element may be a non-reactive resistor, the second line termination element is a non-reactive resistor, and the first and second line termination elements are connected in series and are arranged to provide a termination device having a predetermined line terminating resistor for a physical end of the serial bus.

A blocking device having a blocking element and a third electronic switching device may be provided, which third electronic switching device is arranged to control the first electronic switching device and the second electronic switching device by supplying or withholding a control voltage, wherein the blocking element keeps the first electronic switching device and the second electronic switching device in a blocked state if the third electronic switching device withholds the control voltage from the first electronic switching device and the second electronic switching device.

The first electronic switching device and the second electronic switching device may each be field effect transistors (FETs). On account of the AC voltage characteristic of the bus signal, field effect transistors are more suitable than bipolar transistors, for example, for connecting or disconnecting the terminating resistors since, in contrast to bipolar transistors, they can switch bipolar voltages/currents.

The serial bus may include a CAN bus, and the first electronic switching device and the second electronic switching device are arranged to operate in a common mode range of the CAN bus. However, other differential buses can also be connected.

A voltage output device may be provided and is arranged to output a medium bus voltage of the serial bus in a high-impedance manner.

A voltage source generation device may be provided and is arranged to generate a low-impedance voltage source for providing the control voltage for the first and second electronic switching devices from the medium bus voltage which has been output, wherein the control voltage is generated in such a manner that a gate-source voltage which reliably turns on the first electronic switching device and the second electronic switching device is provided for the first electronic switching device and the second electronic switching device within a common mode range of the serial bus.

The voltage source generation device may be arranged to generate the control voltage for the first and second electronic switching devices within the common mode range of the serial bus on the basis of the medium bus voltage which has been output and, in the event of a shift in the medium bus voltage owing to operation, to track the control voltage and, in association with this, the switchability of the first electronic switching device and of the second electronic switching device at least within the limits of the common mode range of the serial bus.

A voltage regulating device may be provided and is arranged to regulate the control voltage generated by the voltage source generation device to a predetermined value.

A filter, an interference suppression device or an integrating element for suppressing the interference of voltage spikes in the control voltage, in particular for generating a medium bus voltage, may be provided.

An overvoltage protection device for protecting the voltage source generation device from overvoltage may be provided.

A voltage output at which the output voltage of the voltage source generation device can be discharged to an external device for diagnostic purposes may be provided.

The invention is described in more detail below on the basis of exemplary embodiments with reference to the drawings.

DETAILED DESCRIPTION

Figure 1:
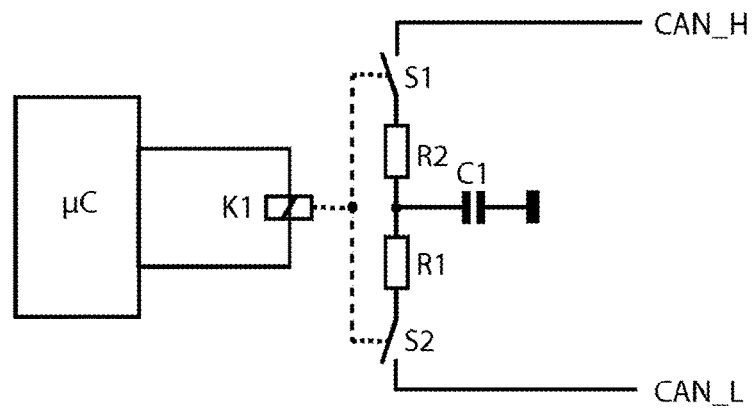
FIG. 1 shows a schematic illustration of an underlying basic configuration of a circuit arrangement for a switchable line termination of a serial bus according to the invention.

It is noted that equivalent or identically acting elements can have the same reference symbols or at least similar reference symbols in the drawing and are each not described again in this case.

FIG. 1 shows a schematic illustration of an underlying basic configuration of a circuit arrangement for a switchable line termination of a serial bus according to the invention.

According to FIG. 1, a microcontroller μC or predetermined ports of the latter is/are connected, via input/output lines or control lines, to a circuit arrangement K which, in the present exemplary embodiment, forms a circuit arrangement for a switchable line termination of a serial bus. The circuit arrangement K comprises termination or (line) terminating resistors for the serial bus and is arranged to connect or disconnect these termination or terminating resistors to/from signal lines CAN_H, CAN_L of the serial bus by electronic switching devices or switches S1, S2 on a case-by-case basis.

A first resistor R1 and a second resistor R2 are connected in series between the electronic switching devices S1, S2 and have a common node, at which a first capacitor C1 is connected to ground or a reference potential. The first resistor R1, the second resistor R2 and the capacitor C1 are used to terminate the connected differential bus as symmetrically as possible with respect to its medium voltage U_rez since asymmetries with respect to the medium voltage U_rez can interfere with the function of the bus.

Figure 2:
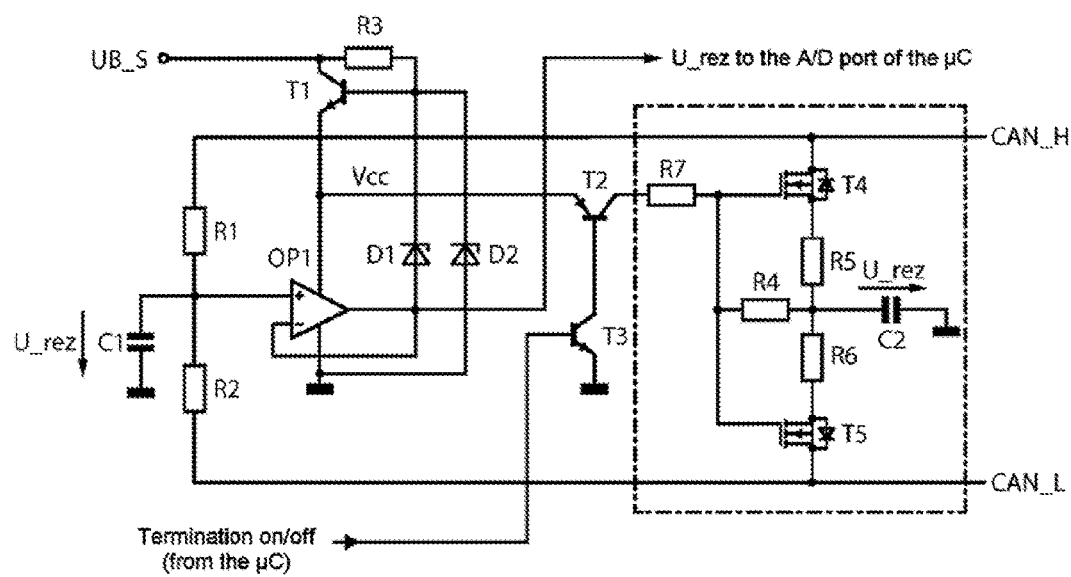
FIG. 2 shows a partial schematic illustration of the circuit arrangement for a switchable line termination of a serial bus according to one exemplary embodiment.

FIG. 2 shows a partial schematic illustration of the circuit arrangement for a switchable line termination of a serial bus according to one exemplary embodiment.

According to FIG. 2, the circuit arrangement according to the present exemplary embodiment comprises the first capacitor C1, the first resistor R1, the second resistor R2, an operational amplifier OP1, a first diode D1 (for example 10 V) and a second diode D2, which are provided as Zener diodes for example, a first transistor T1, a third resistor R3 which can be provided with a value of 10 kΩ for example, a second transistor T2, a third transistor T3, a fourth resistor R4, a fifth resistor R5, a sixth resistor R6, a fourth transistor T4 which may be provided in the form of a field effect transistor, a fifth transistor T5 which may be likewise provided in the form of a field effect transistor, and a second capacitor C2.

In the present exemplary embodiment, the fourth transistor T4 and the fifth transistor T5 form an electronic switching apparatus having a first electronic switching device and a second electronic switching device, and the fifth resistor R5 and the sixth resistor R6 form a predetermined line termination having a first line termination element and a second line termination element. In addition, the fourth resistor R4 forms a blocking element of a blocking device which keeps the two transistors T4 and T5 in the blocked (switched-off) state if the switching transistor T2 is switched off, the second transistor T2 forms a third electronic switching device, the fourth transistor T4 and the fifth transistor T5 form a blocking device for blocking the two switches which connect the terminating resistor to the bus, and the first resistor R1, the second resistor R2 and the first capacitor C1 form a voltage output device.

The circuit arrangement according to the exemplary embodiment can be substantially considered as lying between the signal lines of the serial bus. That is to say, part of the control and/or supply required by the circuit arrangement is derived from the serial bus. A supply voltage is also supplied from outside the circuit arrangement, and the circuit arrangement is connected to port lines to or from the microcontroller μC of an externally controlling electronic control unit or ECU.

Specifically, the first capacitor C1 is connected, on the one hand, to ground or a reference potential and, on the other hand, to a node which also connects the first resistor R1 and the second resistor R2. The above-mentioned medium bus voltage U_rez is applied to the first capacitor C1. One of the connections of the first resistor R1 is connected to one of the CAN signal lines, to CAN_H in the present exemplary embodiment, and one of the connections of the second resistor R2 is connected to the other of the CAN signal lines, to CAN_L in the present exemplary embodiment.

The node also leads to a positive ("+") input of the operational amplifier OP1 which operates as a voltage follower or impedance converter in the present configuration. An inverting ("−") input of the operational amplifier or impedance converter OP1 is connected to the anode of the first diode D1, the cathode of which is connected to the third resistor R3 via a further node. The other connection of the third resistor R3 is at a (supply) potential UB_S.

The operational amplifier OP1 is also connected to the first transistor T1, the collector of which upstream of the resistor R3 is at the potential UB_S and the emitter of which is connected to the positive voltage input of the operational amplifier OP1. The base of the first transistor T1 is connected to the cathode of the first diode D1 and to the cathode of the second diode D2.

The second diode D2 forming an interference suppression device and an overvoltage protection device in this exemplary embodiment is provided for the purpose of suppressing the interference of excessively high voltage spikes in a control voltage Vcc and as overvoltage protection for the operational amplifier OP1. The negative voltage input of the operational amplifier is connected to ground or the reference potential and to the anode of the second diode D2.

In the configuration used here, the operational amplifier OP1 operating as a voltage follower or impedance converter forms a non-inverting (linear) amplifier, the inverting input of which is directly connected to the output. The direct negative feedback produces a gain factor of 1, with the result that the output voltage corresponds exactly to the input voltage in the case of a normal function and the output voltage directly follows the input voltage. Since the input impedance of the positive input is very large and the output impedance is very small in comparison, the operational amplifier OP1 acts as a buffer between a high-impedance voltage source (here the medium bus voltage U_rez which has been output in a high-impedance manner) and a downstream low-impedance load. The load on the input of the high-impedance voltage source is therefore minimal and the voltage level is distorted as little as possible. The operational amplifier OP1 as an impedance converter can therefore make or produce a low-impedance voltage source, which can be loaded by sequential circuits, from a relatively high-impedance voltage source (that is to say the medium bus voltage which has been output) and therefore forms a voltage source generation device or a voltage regulating device in this exemplary embodiment in conjunction with the first diode D1, the third resistor R3 and the first transistor T1.

Other gain factors are naturally possible.

The voltage at the output of the operational amplifier OP1 (approximately U_rez) which is likewise applied to the anode of the first diode D1 can be supplied to an analog/digital or A/D port of the microcontroller μC in the present exemplary embodiment for diagnostic purposes and the like, for example, and can trigger a fault message in an overall system, for example in a vehicle, in the case of a value which is below or above a limit value.

In the present exemplary embodiment, the supply voltage for OP1 is expediently also generated by the first (Zener) diode D1 and the third resistor R3 which form a stabilization circuit in this configuration. Specifically, the circuit is described as follows: OP1 is supplied with the voltage Vcc. Assuming that the output of OP1 is still at an undefined voltage close to 0 V directly after the ECU has been switched on, Vcc is limited to the voltage value of D2 (for example 20 V) by the Zener diode D2. OP1 captures the medium bus voltage U_rez and outputs it at the output of OP1 in a low-impedance manner; the anode of D1 is connected to the output of OP1. The result is Vcc=U_rez+UD1, that is to say Vcc is now regulated by OP1 and no longer by UD2. The following applies: UD1<UD2 and Vcc must always be smaller than the permissible UGS of the two FETs T4/T5.

According to FIG. 2, in the circuit arrangement according to the exemplary embodiment, the emitter of the second transistor T2 is furthermore at the voltage Vcc, the base of the second transistor T2 is connected to the seventh resistor R7 and the other side of the seventh (please renumber if necessary) resistor R7 is connected to the collector of the third transistor T3, and the collector of the second transistor T2 is connected to the gate of the fourth (field effect) transistor T4, to the gate of the fifth (field effect) transistor T5 and to one of the connections of the fourth resistor R4. A termination, connection or disconnection signal is supplied to the base of the third transistor T3 by the microcontroller μC of the external electronic control unit, and the emitter of the third transistor T3 is connected to ground or the reference potential.

In the case of the fourth transistor T4, its drain is also connected to the higher-level bus line CAN_H and its source is connected to a connection of the fifth resistor R5, whereas, in the case of the fifth transistor T5, its drain is connected to the lower-level bus line CAN_L and its source is connected to a connection of the sixth resistor R6. The respective other connections of the fourth resistor R4, of the fifth resistor R5 and of the sixth resistor R6 are combined at a common node, to which the second capacitor C2 is also connected, the other connection of which is at ground or the reference potential. In this respect, the fourth transistor T4 and the fifth transistor T5 are reverse-arranged in series (the respective source regions are connected to a common node via the resistors R5, R6) in this configuration. It is noted that the medium bus voltage U_rez is also applied to the second capacitor C2.

The method of operation of the circuit arrangement described thus far with reference to FIG. 2 is additionally explained in more detail below with further reference to FIG. 3.

According to the present exemplary embodiment, the two terminating or termination resistors, that is to say the fifth resistor R5 and the sixth resistor R6 which form a termination device in this exemplary embodiment, are symmetrically or simultaneously connected to the two field effect transistors, that is to say the fourth transistor T4 and the fifth transistor T5.

The two FETs T4, T5 are reverse-connected in series with one another and, in the activated state, connect the two resistors R5, R6 to the connected bus. The FETs are voltage-controlled, that is to say deenergized.

In this context, the fourth resistor R4 is arranged to keep both field effect transistors T4, T5 blocked as long as the second transistor T2 does not provide a voltage signal, that is to say withholds such a signal from the fourth and fifth transistors T4, T5. This corresponds to a state in which the termination resistors R5, R6 are disconnected from the serial bus.

In order to turn on, the field effect transistors T4, T5 require a gate-source voltage or a turn-on voltage or a control voltage Vcc of at least 5 V. The control voltage Vcc may be at least 10 V, at most approximately 20 V. Since the common mode range of the serial bus, which is, for example, between −5 V and +12 V in the case of the CAN bus used in this exemplary embodiment, must not be restricted, the control voltage Vcc must therefore be able to provide a gate-source voltage of at least 5 V or 10 V within this entire common mode range.

Figure 3:
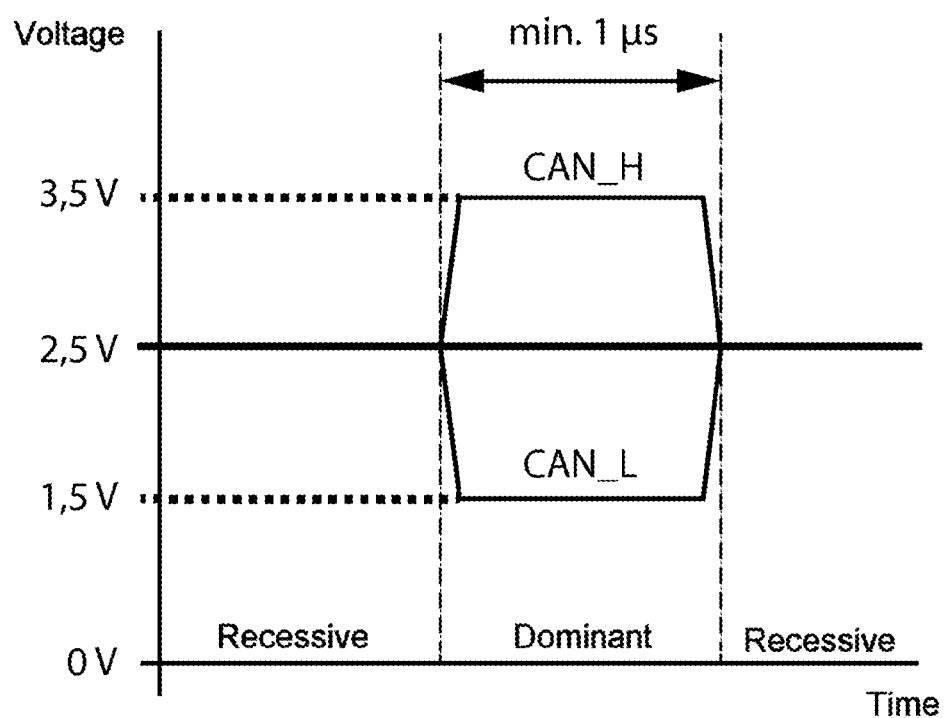
FIG. 3 shows a schematic illustration with reference to a partial signal profile using the example of a CAN bus.

FIG. 3 shows a schematic illustration with reference to a partial signal profile using the example of a CAN bus, more specifically with reference to voltage changes on the CAN lines in the event of a change between the dominant state and the recessive state.

In an idle state, both bus lines are at an equal preset idle level of 2.5 V. This idle level is also referred to as a recessive state. In the dominant state, the voltage on the CAN high line rises by at least 1 V above the recessive level. The voltage on the CAN low line falls by at least 1 V below the recessive level. This means that the voltage on the CAN high line in the active state rises to at least 3.5 V (2.5 V+1 V=3.5 V) and the voltage on the CAN low line falls to a maximum of 1.5 V (2.5 V−1 V=1.5 V). The voltage difference between the CAN high line and the CAN low line is therefore 0 V in the recessive state and at least 2 V in the dominant state.

In order to obtain the above-mentioned control voltage on the above-mentioned basis, the medium bus voltage U_rez (approximately +2.5 V as stated above) is therefore output in this exemplary embodiment in a high-impedance manner from the CAN bus via the first and second resistors R1, R2, which have the same design as such, and the first capacitor C1 as a filter. In this case, the high-impedance output ensures that the bus is influenced as little as possible. The operational amplifier OP1 operating as an impedance converter converts the medium bus voltage U_rez which has been output into a low-impedance voltage source, as described above. Starting from the output of the operational amplifier OP1, the first (Zener) diode D1 with 10 V, for example, is connected to the third resistor R3 operating as a series resistor and to the first transistor T1 operating as a series transistor which, in interaction, form a variable voltage regulator. In this case, the control voltage Vcc is regulated to the value of approximately the sum of the Zener diode voltage of the first diode D1 and the voltage U_rez at the output of the operational amplifier OP1.

The medium bus voltage U_rez which has been output is likewise applied to the node or center point of the two terminating or termination resistors R5, R6 and of the second capacitor C2 provided that the fourth transistor T4 and the fifth transistor T5 are turned on. In addition, the medium bus voltage U_rez which has been output is applied to the two source connections of the fourth transistor T4 and of the fifth transistor T5. In order to turn on the fourth transistor T4 and the fifth transistor T5, the gate-source voltage at the transistors T4, T5 must be at least 5 V. For this purpose, the control voltage Vcc must be greater than the output medium bus voltage U_rez+5 V. The circuit arrangement in the present exemplary embodiment is configured for a gate-source voltage of approximately 10 V and can therefore fully activate the fourth transistor T4 and the fifth transistor T5. An activated or turned-on state of the fourth transistor T4 and of the fifth transistor T5 corresponds to a state in which the termination resistors R5, R6 are connected to the serial bus.

A marginal consideration is given below for the common mode range of the serial bus, which, as mentioned above, must not be restricted and is between approximately −5 V and +12 V.

If the medium bus or signal voltage or common mode voltage is shifted to a maximum of 12 V as the upper limit of the common mode range, for example as a result of a bus error or ground offsets, the operational amplifier OP1 tracks the control voltage Vcc to this level, and the first transistor T4 and the second transistor T5 are accordingly controlled in this case with a gate-source voltage of approximately 22 V. The common mode range is therefore not restricted in this direction by the circuit arrangement according to the present exemplary embodiment.

If, in contrast, the medium bus voltage U_rez which has been output falls below the ground potential or reference potential (for example GND), the output of the operational amplifier OP1 remains at the ground potential or reference potential. In this case, the control voltage Vcc in any case reaches approximately 10 V on account of the first diode D1, and the fourth transistor T4 and the fifth transistor T5 are reliably turned on with a gate-source voltage of approximately 10 V and 15 V, respectively. The common mode range is therefore not restricted in this direction either by the circuit arrangement according to the present exemplary embodiment.

A circuit arrangement for a switchable line termination of a serial bus was therefore described above, which circuit arrangement comprises an electronic switching apparatus T4, T5 which is connected between signal lines of the serial bus and is arranged, under the control of a control device of an electronic control unit, to connect a predetermined line termination to the serial bus or to disconnect the line termination from the serial bus. The electronic switching apparatus T4, T5 comprises a first and a second electronic switching device T4, T5, and the line termination R5, R6 comprises a first and a second line termination element R5, R6. The first and second electronic switching devices T4, T5 are reverse-connected in series with one another and are arranged to connect the first and second line termination elements (R5, R6) to the first and second signal lines CAN_H, CAN_L of the serial bus, respectively, or to disconnect them therefrom in a symmetrical and voltage-controlled manner.

In other words, the electronic switching apparatus T4, T5 comprises a first electronic switching device T4 and a second electronic switching device T5, and the line termination R5, R6 comprises a first line termination element R5 and a second line termination element R6. The first electronic switching device T4 lies between a first signal line CAN_H of the serial bus and the first line termination element R5 and is arranged to connect the first line termination element R5 to the first signal line CAN_H of the serial bus or to disconnect it therefrom in a voltage-controlled manner. The second electronic switching device T5 lies between a second signal line CAN_L of the serial bus and a second line termination element R6 and is arranged to connect the second line termination element R6 to the second signal line CAN_L of the serial bus or to disconnect it therefrom in a voltage-controlled manner. The first and second electronic switching devices T4, T5 are reverse-connected in series with one another and can be controlled to symmetrically connect the first line termination element R5 and the second line termination element R6 and to connect them to the respective signal lines CAN_H, CAN_L of the serial bus or to disconnect them from the latter.

It goes without saying that the invention is not restricted to the exemplary embodiment specifically described above, but rather modifications which result in equivalent, comparable or similar configurations are readily apparent to a person skilled in the art and therefore cannot be deemed to be deviations from the subject matter of the invention as defined in the following claims.

LIST OF REFERENCE SYMBOLS

K Circuit arrangement
μC Microcontroller
C1 First capacitor
C2 Second capacitor
T1 First transistor
T2 Second transistor
T3 Third transistor
T4 Fourth transistor
T5 Fifth transistor
R1 First resistor
R2 Second resistor
R3 Third resistor
R4 Fourth resistor
R5 Fifth resistor
R6 Sixth resistor
R7 Seventh resistor
D1 First diode
D2 Second diode
OP1 Operational amplifier
Vcc Control voltage
UB_S Supply voltage
U_rez Medium bus voltage

The invention claimed is:

1. A circuit arrangement for a switchable line termination of a serial bus, comprising:
   an electronic switching apparatus which is connected between signal lines of the serial bus and is configured, under the control of a control device of an electronic control unit, to connect a predetermined line termination to the serial bus or to disconnect the line termination from the serial bus; and
   a voltage output device to output a medium bus voltage of the serial bus in a high-impedance manner.

2. The circuit arrangement of claim 1, wherein the electronic switching apparatus includes a first and a second electronic switching device, wherein the line termination includes a first and a second line termination element, wherein the first and second electronic switching devices are reverse-connected in series with one another, and wherein the first and second electronic switching devices are arranged to connect the first and second line termination elements to the first and second signal lines of the serial bus, respectively, or to disconnect them therefrom in a symmetrical and voltage-controlled manner.

3. The circuit arrangement of claim 1, wherein the first line termination element is a non-reactive resistor, the second line termination element is a non-reactive resistor, and the first and second line termination elements are connected in series and are configured to provide a termination device having a predetermined line terminating resistor for a physical end of the serial bus.

4. The circuit arrangement of claim 1, wherein the first electronic switching device and the second electronic switching device form a blocking device which is arranged to block a signal having an AC voltage characteristic on the serial bus.

5. The circuit arrangement of claim 1, wherein the first electronic switching device and the second electronic switching device are field effect transistors or MOSFETs.

6. The circuit arrangement of claim 1, wherein the serial bus is a differential bus, which includes a CAN bus, and the first electronic switching device and the second electronic switching device are configured to operate in a common mode range of the bus.

7. The circuit arrangement of claim 1, further comprising:
   a voltage source generation device to generate a low-impedance voltage source for providing the control voltage for the first and second electronic switching devices from the medium bus voltage which has been output, wherein the control voltage is generated so that a gate-source voltage which reliably turns on the first electronic switching device and the second electronic switching device is provided for the first electronic switching device and the second electronic switching device within a common mode range of the serial bus.

8. The circuit arrangement of claim 7, wherein the voltage source generation device is arranged to generate the control voltage for the first and second electronic switching devices within the common mode range of the serial bus on the basis of the medium bus voltage which has been output and, in the event of a shift in the medium bus voltage owing to operation, to track the control voltage and, in association with this, the switchability of the first electronic switching device and of the second electronic switching device at least within the limits of the common mode range of the serial bus.

9. The circuit arrangement of claim 7, further comprising:
   a voltage regulating device to regulate the control voltage generated by the voltage regulators to a predetermined value.

10. The circuit arrangement of claim 7, further comprising:
    an overvoltage protection device for protecting the voltage source generation device from overvoltage.

11. The circuit arrangement of claim 7, further comprising:
    a voltage output at which the output voltage of the voltage source generation device can be discharged to an external device for diagnostic purposes.

12. The circuit arrangement of claim 7, wherein the voltage source generation device is configured to generate the control voltage for the first and second electronic switching devices within the common mode range of the serial bus based on the medium bus voltage which has been output.

13. The circuit arrangement of claim 12, wherein in the event of a shift in the medium bus voltage, the voltage source generation device is configured to track the control voltage and the switchability of the first electronic switching device and of the second electronic switching device.

14. The circuit arrangement of claim 1, wherein the electronic switching apparatus includes a first and a second electronic switching device, wherein the line termination includes a first and a second line termination element, and wherein the first and second electronic switching devices are reverse-connected in series with one another.

15. The circuit arrangement of claim 14, wherein the first and second electronic switching devices are arranged to connect the first and second line termination elements to the first and second signal lines of the serial bus, respectively, or to disconnect them therefrom.

16. The circuit arrangement of claim 1, wherein the first line termination element is a non-reactive resistor, the second line termination element is a non-reactive resistor, and the first and second line termination elements are connected in series.

17. The circuit arrangement of claim 16, wherein the first and second line termination elements are configured to provide a termination device.

18. The circuit arrangement of claim 1, wherein the first electronic switching device and the second electronic switching device form a blocking device.

19. The circuit arrangement of claim 1, wherein the first electronic switching device and the second electronic switching device includes field effect transistors.

20. The circuit arrangement of claim 1, wherein the serial bus includes a differential bus, and the first electronic switching device and the second electronic switching device are configured to operate in a common mode range of the bus.

21. The circuit arrangement of claim 1, further comprising:
   a voltage source generation device to generate a low-impedance voltage source for providing the control voltage for the first and second electronic switching devices from the medium bus voltage which has been output.

22. The circuit arrangement of claim 21, wherein the control voltage is generated so that a gate-source voltage which turns on the first electronic switching device and the second electronic switching device is provided for the first electronic switching device and the second electronic switching device.

23. A circuit arrangement for a switchable line termination of a serial bus, comprising:
   an electronic switching apparatus which is connected between signal lines of the serial bus and is configured, under the control of a control device of an electronic control unit, to connect a predetermined line termination to the serial bus or to disconnect the line termination from the serial bus;
   a blocking device having a blocking element; and
   a third electronic switching device to control the first electronic switching device and the second electronic switching device by supplying or withholding a control voltage;
   wherein the blocking element keeps the first electronic switching device and the second electronic switching device in a blocked state if the third electronic switching device withholds the control voltage from the first electronic switching device and the second electronic switching device.

24. The circuit arrangement of claim 23, wherein the blocking element is a non-reactive resistor which is connected to a common node of the first line termination element and of the second line termination element, and the third electronic switching device is an electronic switch, which includes a bipolar transistor or a MOSFET, which switches based on a control signal supplied by the external control device.

25. The circuit arrangement of claim 23, further comprising:
   an overvoltage limitation device for suppressing the interference of voltage spikes in the control voltage.

26. The circuit arrangement of claim 23, wherein the blocking element is a non-reactive resistor which is connected to a common node of the first line termination element and of the second line termination element, and the third electronic switching device is an electronic switch.

27. The circuit arrangement of claim 26, wherein the electronic switch includes a bipolar transistor or a MOSFET.

* * * * *